United States Patent
Heitmann et al.

(10) Patent No.: US 7,475,474 B2
(45) Date of Patent: Jan. 13, 2009

(54) METHOD OF MAKING TAMPER DETECTION CIRCUIT FOR AN ELECTRONIC DEVICE

(75) Inventors: Kjell A Heitmann, Norwalk, CT (US); Douglas A Clark, Wallingford, CT (US); Paul G Perreault, Wallingford, CT (US)

(73) Assignee: Pitney Bowes Inc., Stamford, CT (US)

( * ) Notice: Subject to any disclaimer, the term of this patent is extended or adjusted under 35 U.S.C. 154(b) by 193 days.

(21) Appl. No.: 11/651,817

(22) Filed: Jan. 10, 2007

(65) Prior Publication Data

US 2007/0175023 A1      Aug. 2, 2007

Related U.S. Application Data

(62) Division of application No. 10/868,337, filed on Jun. 15, 2004, now Pat. No. 7,180,008.

(60) Provisional application No. 60/538,554, filed on Jan. 23, 2004.

(51) Int. Cl.
*H05K 3/30* (2006.01)
*H01R 43/00* (2006.01)

(52) U.S. Cl. .............................. 29/832; 29/825; 29/840; 174/535; 361/749; 361/752

(58) Field of Classification Search .................. 29/825, 29/830, 840; 174/535; 361/749, 752
See application file for complete search history.

(56) References Cited

U.S. PATENT DOCUMENTS

| 4,160,503 A | 7/1979 | Ohlbach |
| 4,211,324 A | 7/1980 | Ohlbach |
| 4,516,679 A | 5/1985 | Simpson et al. |
| 4,593,384 A | 6/1986 | Kleijne et al. |
| 4,609,104 A | 9/1986 | Kasper et al. |
| 4,653,252 A | 3/1987 | van der Haar et al. |
| 4,677,809 A | 7/1987 | Long et al. |
| 4,691,350 A | 9/1987 | Kleijne et al. |
| 4,807,284 A | 2/1989 | Kleijne |

(Continued)

FOREIGN PATENT DOCUMENTS

DE      19816571 A1     10/1999

(Continued)

OTHER PUBLICATIONS

FIPS PUB 140-2 Federal Information Processing Standards Publication—Security Requirements for Cryptographic Modules, Issued May 25, 2001.

*Primary Examiner*—C. J Arbes
(74) *Attorney, Agent, or Firm*—Brian A. Lemm; Angelo N. Chaclas

(57) ABSTRACT

A tamper protected printed circuit board assembly including a printed circuit board and a partially enveloping tamper wrap covering the entirety of the top surface of the printed circuit board and a first portion of the bottom surface of the printed circuit board, wherein a second portion of the bottom surface of the printed circuit board is not covered by the tamper wrap is provided. The printed circuit board includes two security trace layers each having two security traces thereon, preferably in a serpentine pattern. The tamper wrap and the security traces together cover and prevent tampering with the electronic circuitry of the printed circuit board.

7 Claims, 5 Drawing Sheets

U.S. PATENT DOCUMENTS

| | | | |
|---|---|---|---|
| 4,811,288 A | | 3/1989 | Kleijne et al. |
| 4,860,351 A | | 8/1989 | Weingart |
| 4,865,197 A | | 9/1989 | Craig |
| 5,009,311 A | | 4/1991 | Schenk |
| 5,027,397 A | * | 6/1991 | Double et al. .............. 713/194 |
| 5,075,822 A | | 12/1991 | Baumier et al. |
| 5,117,457 A | | 5/1992 | Comerford et al. |
| 5,185,717 A | * | 2/1993 | Mori ........................ 365/52 |
| 5,201,868 A | | 4/1993 | Johnson |
| 5,211,618 A | | 5/1993 | Stoltz |
| 5,239,664 A | * | 8/1993 | Verrier et al. ................ 726/27 |
| 5,389,738 A | * | 2/1995 | Piosenka et al. ............ 174/528 |
| 5,406,630 A | | 4/1995 | Piosenka et al. |
| 5,675,319 A | | 10/1997 | Rivenberg et al. |
| 5,715,652 A | | 2/1998 | Staheicker |
| 5,761,054 A | * | 6/1998 | Kuhn ........................ 361/818 |
| 5,858,500 A | | 1/1999 | MacPherson |
| 5,880,523 A | | 3/1999 | Candelore |
| 5,988,510 A | | 11/1999 | Tuttle et al. |
| 6,121,544 A | | 9/2000 | Petsinger |
| 6,195,267 B1 | | 2/2001 | MacDonald, Jr. et al. |
| 6,201,296 B1 | * | 3/2001 | Fries et al. ................ 257/679 |
| 6,261,215 B1 | | 7/2001 | Imer |
| 6,424,954 B1 | | 7/2002 | Leon |
| 6,438,825 B1 | * | 8/2002 | Kuhn ........................ 29/830 |
| 6,469,625 B1 | | 10/2002 | Tomooka |
| 6,473,304 B1 | | 10/2002 | Stevens |
| 6,643,995 B1 | | 11/2003 | Koyama et al. |
| 6,686,539 B2 | | 2/2004 | Farquhar et al. |
| 6,853,093 B2 | | 2/2005 | Cohen et al. |
| 6,929,900 B2 | | 8/2005 | Farquhar et al. |
| 6,970,360 B2 | | 11/2005 | Sinha |
| 6,985,362 B2 | | 1/2006 | Mori et al. |
| 6,996,953 B2 | | 2/2006 | Perreault et al. |
| 7,015,823 B1 | | 3/2006 | Gillen et al. |
| 7,054,162 B2 | | 5/2006 | Benson et al. |
| 7,057,896 B2 | | 6/2006 | Matsuo et al. |
| 7,095,615 B2 | | 8/2006 | Nichols |
| 2001/0056542 A1 | | 12/2001 | Cesana et al. |
| 2002/0002683 A1 | | 1/2002 | Benson et al. |
| 2002/0084090 A1 | | 7/2002 | Farquhar et al. |

FOREIGN PATENT DOCUMENTS

| | | |
|---|---|---|
| DE | 19816572 A1 | 10/1999 |
| EP | 0629497 A2 | 12/1994 |
| EP | 1184773 A1 | 3/2002 |
| EP | 1207444 A2 | 5/2002 |
| GB | 2174830 A | 11/1986 |
| GB | 2297540 A | 8/1996 |
| GB | 2298391 A | 9/1996 |
| GB | 2330439 A | 4/1999 |
| WO | 99/21142 | 4/1999 |
| WO | 01/63994 A2 | 8/2001 |

* cited by examiner

METHOD OF MAKING TAMPER DETECTION CIRCUIT FOR AN ELECTRONIC DEVICE

CROSS-REFERENCE TO RELATED APPLICATIONS

This application is a divisional application of prior application Ser. No. 10/868,337, filed Jun. 15, 2004, now U.S. Pat. No. 7,180,008, which claims the benefit of U.S. Provisional Application Ser. No. 60/538,554, filed on Jan. 23, 2004, the specifications of which are hereby incorporated by reference.

FIELD OF THE INVENTION

The present invention relates to tamper detection and protection for electronic circuitry, and more particularly, to a printed circuit board assembly including a multilayer printed circuit board having a built-in tamper detection element and a partially enveloping tamper detection wrap.

BACKGROUND OF THE INVENTION

In many electronic applications, it is often desirable or even required to protect electronic circuitry, such as on a printed circuit board (PCB), from unlawful or unauthorized access. This is especially true for electronic circuitry that includes cryptographic modules or functionality. For example, postage security devices (PSDs) are required by the United States Postal Service to comply with FIPS 140-2 level 3 issued by the National Institute of Standards and Technology (NIST). FIPS 140-2 level 3 requires that PSDs have a full envelope of physical tamper protection and detection which encloses all electrical nodes.

Prior art methods of tamper protection, such as disclosed in U.S. Pat. No. 5,858,500, involve wrapping the entire electronic circuitry, such as a PCB, in a flexible tamper respondent laminate. The laminate in such methods is soldered to the electronic circuitry to complete the detection circuits and potted using an encapsulating epoxy or the like. Due to the manual manipulation required, these methods are typically time consuming and not well suited to automated/mass production.

SUMMARY OF THE INVENTION

The present invention relates to a printed circuit board assembly having tamper detection elements. The assembly of the present invention includes a printed circuit board and a tamper wrap that covers the entirety of the top surface of the printed circuit board and a first portion of the bottom surface of the printed circuit board. A second portion of the bottom surface of the printed circuit board is not covered by the tamper wrap. The printed circuit board includes a PCB circuitry portion having one or more layers and electronic circuit components mounted thereon. The printed circuit board further includes a first security trace layer adjacent to the PCB circuitry portion, the first security trace layer having first and second traces thereon covering a first area of the first security trace layer, and a second security trace layer adjacent to the first security trace layer having third and fourth traces thereon covering a first area of the second security trace layer. The tamper wrap further includes fifth and sixth traces thereon. The first area of the first security layer and the first area of the second security layer each extend across substantially the entirety of the second portion of the bottom surface of the printed circuit board. The first, third and fifth traces are connected in series and form a part of a first tamper detection circuit path and the second, fourth and sixth traces are connected in series and form a second tamper detection circuit path, wherein the tamper wrap and the first, second, third and fourth traces together cover and detect tampering with the electronic circuitry of the PCB circuitry portion and components mounted thereon.

The printed circuit board assembly of the present invention may further include a tamper detection circuit provided on the PCB circuitry portion, with the first, second, fifth and sixth traces being connected to the tamper detection circuit. The tamper detection circuit detects whether any one of the first, second, third, fourth, fifth and sixth traces is broken or shorts to another trace. In a preferred embodiment, the first, second, third and fourth traces each have a serpentine pattern. The first and second traces may run adjacent to one another and the third and fourth traces may run adjacent to one another, and each may preferably be separated by approximately 5 mils (0.005 inch) or less. In a preferred embodiment, the first and second traces are offset from the third and fourth traces, such as by 5 mils or less, such that the first and second traces are aligned in gaps between the third and fourth traces.

The printed circuit board may further include a ground plane layer adjacent to a top surface of the second security trace layer, wherein the ground plane layer obscures the first, second, third and fourth traces from view. The printed circuit board may also further include a secondary side layer adjacent to the ground plane layer. In this embodiment, the secondary side layer includes first, second, third and fourth electrical contacts, the first electrical contact being connected to the third trace, the second electrical contact being connected to the fourth trace, and the third and fourth electrical contacts being connected to a tamper detection circuit provided in the PCB circuit portion. The tamper wrap in this embodiment further includes fifth, sixth, seventh and eighth electrical contacts, a first end of the fifth trace being connected to the fifth electrical contact, a second end of the fifth trace being connected to the sixth electrical contact, a first end of the sixth trace being connected to the seventh electrical contact, and a second end of the sixth trace being connected to the eighth electrical contact, wherein the first electrical contact is connected to the fifth electrical contact, the second electrical contact is connected to the seventh electrical contact, the third electrical contact is connected to the sixth electrical contact and the fourth electrical contact is connected to the eighth electrical contact, and wherein the first and second traces are connected to the tamper detection circuit. The fifth and sixth traces may each have a serpentine pattern.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DETAILED DESCRIPTION OF THE PREFERRED EMBODIMENTS

Figure 1:
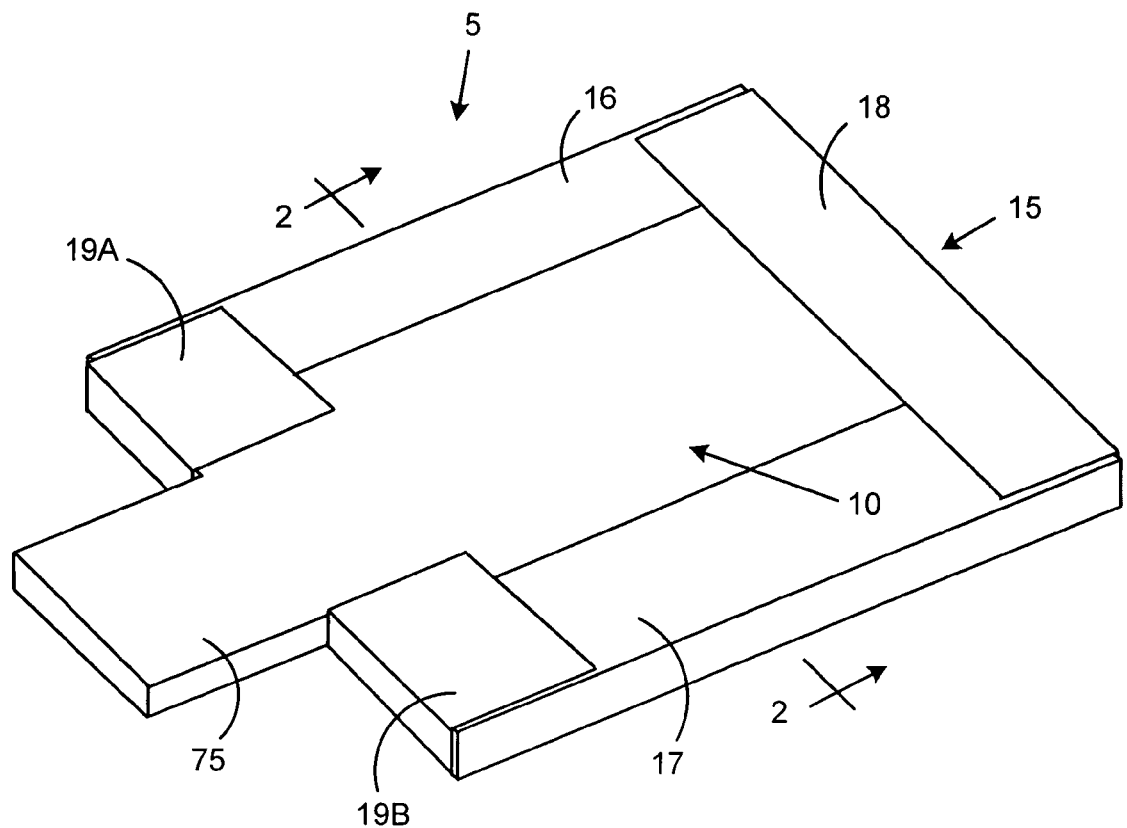
FIG. 1 is an isometric view of a PCB assembly according to the present invention.

Referring to FIG. 1, the present invention relates to a PCB assembly, shown at reference numeral 5, that includes a multilayer PCB 10 and a tamper wrap 15 that partially envelops PCB 10. As described in more detail below, PCB 10 is provided with electrical security elements that provide tamper protection in the areas of PCB 10 not covered by tamper wrap 15. Together, these security elements and tamper wrap 15 provide a full envelope of tamper protection for all of the electrical components of PCB 10.

Figure 2:
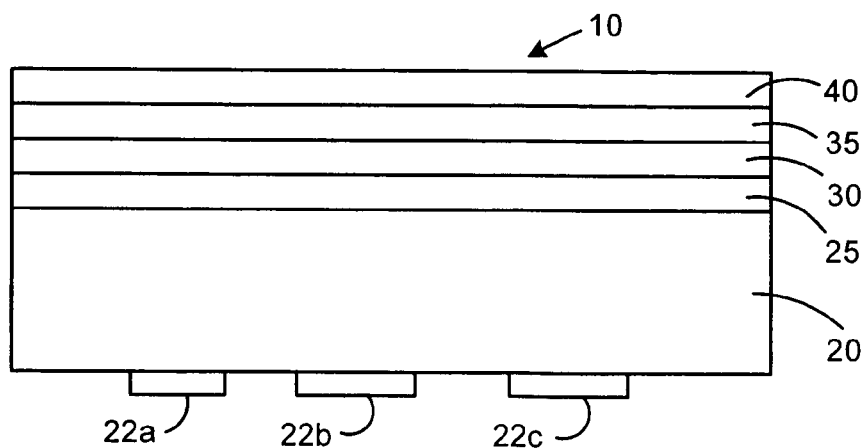
FIG. 2 is a cross-sectional view of a PCB forming a part of the PCB assembly shown in FIG. 1 taken along lines 2-2 in FIG. 1.

Referring to FIG. 2, a cross-sectional diagram of PCB 10 taken along lines 2-2 in FIG. 1 is provided which shows each of the layers of PCB 10. Each of the layers of PCB 10 includes a substrate or base, made of, for example, fiberglass or glass epoxy, on which various elements are provided as described herein. PCB circuitry portion 20 actually includes a number of layers, such as those included in a standard PCB, for example, a common six layer PCB. As will be appreciated by those skilled in the art, those layers preferably include a primary layer on which electrical components 22a-2c, such as, for example, integrated circuit chips, resistors, capacitors, and the like, are mounted, a ground plane layer, first, second and third signal layers, and a VCC plane layer. The individual layers of PCB circuitry portion 20 are laminated to one another and all required electrical connections are made using vias provided in the layers.

Figure 3:
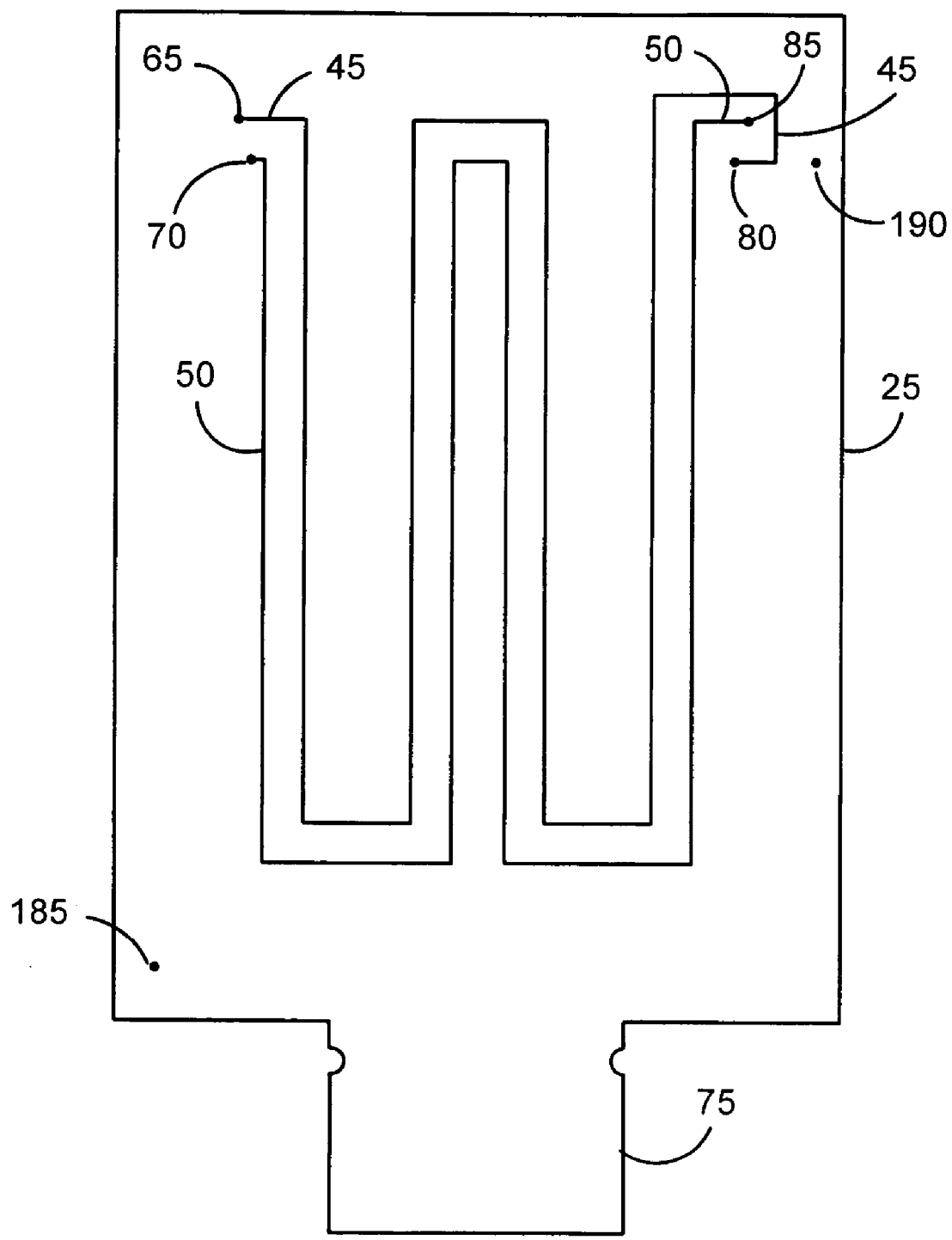
FIG. 3 is a top plan view of a first security trace layer forming a part of the PCB shown in FIG. 2.
Figure 4:
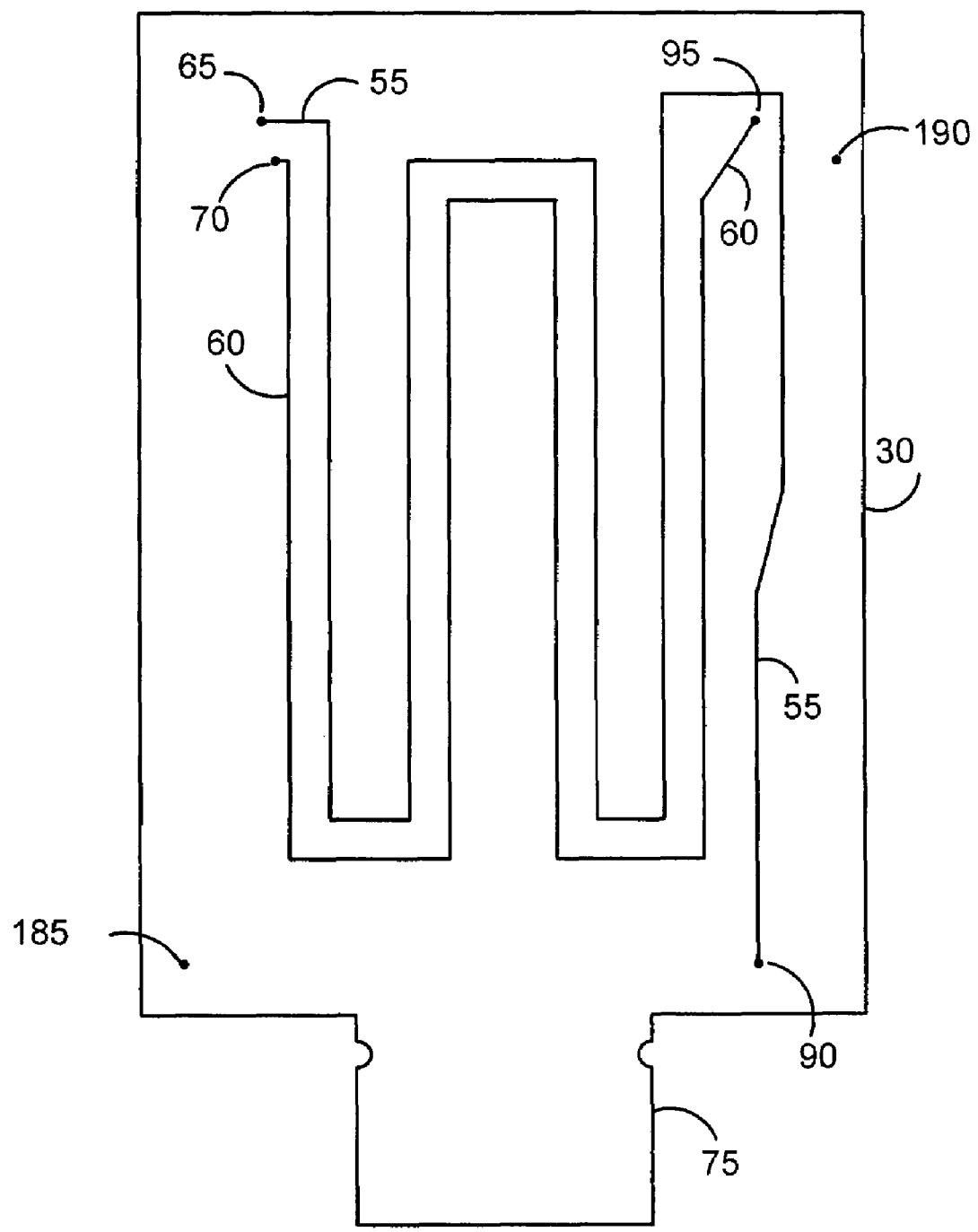
FIG. 4 is a top plan view of a second security trace layer forming a part of the PCB shown in FIG. 2.

As seen in FIG. 2, first security trace layer 25 and second security trace layer 30 are laminated on top of PCB circuitry portion 20. FIGS. 3 and 4 show representations of first security trace layer 25 and second security trace layer 30, respectively. As seen in FIG. 3, first security trace layer 25 has provided thereon first and second serpentine traces 45 and 50 (only portions of which are illustrated in FIG. 3 for clarity) that preferably run adjacent to one another. Similarly, second security trace layer 30 has provided thereon first and second serpentine traces 55 and 60 (only portions of which are illustrated in FIG. 4 for clarity) that preferably run adjacent to one another. Serpentine traces 45, 50, 55 and 60 are made of conductive material, and preferably made of copper, and are formed using conventional printed circuit board manufacturing methods. Serpentine trace 45 is connected to serpentine trace 55 through a via 65, and serpentine trace 50 is connected to serpentine trace 60 through a via 70. Most preferably, serpentine traces 45, 50, 55 and 60 are 5 mils wide or less, with 5 mils or less separating serpentine traces 45 and 50 on first security trace layer 25 and 5 mils or less separating serpentine traces 55 and 60 on second security trace layer 30. The areas on first and second security trace layers 25 and 30 where serpentine traces 45, 50, 55 and 60 are routed extend across and cover substantially all of the surface of PCB 10 shown in FIG. 1 (with the exception of tab 75) that is not covered by tamper wrap 15. As such, serpentine traces 45, 50, 55 and 60 in combination with tamper wrap 15 cover and restrict access to all of the electronics and electrical nodes provided on PCB 10. In addition, serpentine traces 45 and 50 on first security trace layer 25 are offset from serpentine traces 55 and 60 on second security trace layer 30, most preferably by 5 mils or less, to ensure that there are no gaps in the area covered by serpentine traces 45, 50, 55 and 60. Specifically, serpentine traces 45, 50, 55 and 60 are provided in offset patterns such that if security trace layer 25 is overlaid with security trace layer 30, serpentine traces 45 and 50 will be aligned in between the gaps between serpentine traces 55 and 60. If serpentine traces 45 and 50 were not offset from serpentine traces 55 and 60 (i.e., if they were lined up directly one on top of the other), a gap in coverage may be left that could be subject to probing or some other physical intrusion. It will be appreciated that while a serpentine shape is preferred, the traces provided on security trace layers 25 and 30 may take shapes other than a serpentine shape without departing from the scope of the present invention.

Referring again to FIG. 3, serpentine trace 45 is connected to tamper detection circuitry provided on PCB circuitry portion 20 through a via 80. Similarly, serpentine trace 50 is connected to tamper detection circuitry provided on PCB circuitry portion 20 through a via 85. The functionality of the tamper detection circuitry provided on PCB circuitry portion 20 will be described in greater detail below Referring again to FIG. 2, ground plane layer 35 is laminated on top of second security trace layer 30. Ground plane layer 35 obscures from view the security traces, e.g., serpentine traces 45, 50, 55 and 60, provided on first and second security trace layers 25 and 30, thereby making it more difficult for an unauthorized person to avoid contact with the security traces while attempting to access the electronics provided on PCB circuitry portion 20. PCB secondary side layer 40 is laminated on top of ground plane layer 35 and is used to make electrical connections to tamper wrap 15. Specifically, referring to FIGS. 4 and 5, serpentine trace 55 is connected to electrical contact 100 provided on PCB secondary side layer 40 through via 90, and serpentine trace 60 is connected to electrical contact 105 provided on PCB secondary side layer 40 though via 95. As described in greater detail below, electrical contacts 100 and 105 are used to make electrical connection to tamper wrap 15 when tamper wrap 15 is wrapped around PCB 10 as shown in FIG. 1.

Figure 6:
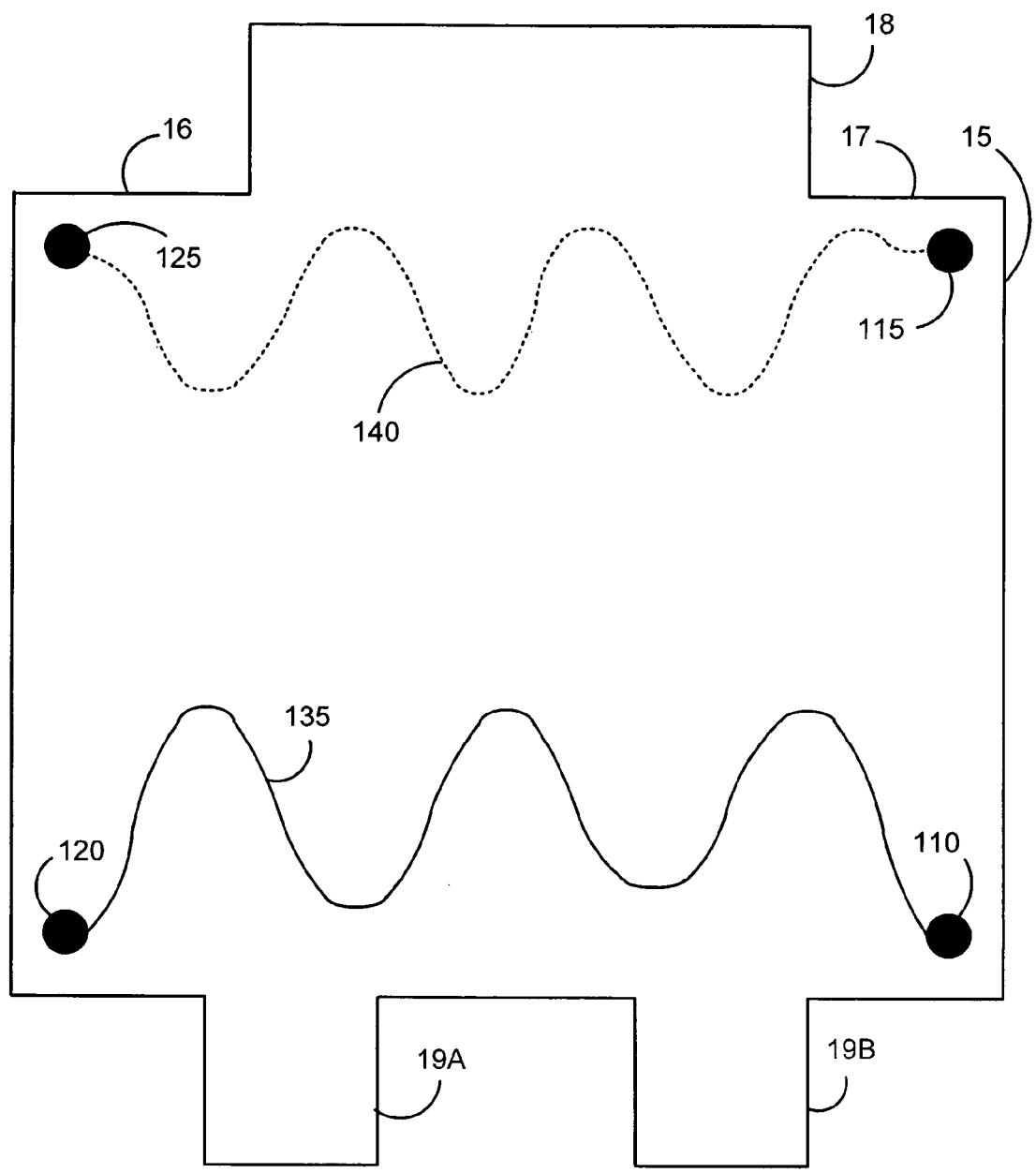
FIG. 6 is a top plan view of a tamper wrap forming a part of the PCB assembly shown in FIG. 1.

FIG. 6 is a top plan view of tamper wrap 15, which is formed from a flexible film material. In the preferred embodiment, tamper wrap 15 includes first side tab 16 opposite second side tab 17 and third side tab 18 opposite fourth side tabs 19A and 19B. Two fourth side tabs 19A and 19B are provided to accommodate tab 75 of PCB 10. It will be appreciated that a single tab, similar to third side tab 18, may be provided for PCBs that do not include tab 75. Tamper wrap 15 can include one or more layers of conductive material and insulating material. Tamper wrap 15 is also provided with first and second security traces 135 and 140 secured to the top surface and bottom surface, respectively of the tamper wrap 15, preferably by an adhesive. Preferably, the traces are provided in a serpentine pattern, which may be random, pseudo-random or fixed, and cover at least a portion of each surface of the tamper wrap 15, including the side tabs 16, 17, 18, 19a and 19b.

Figure 5:
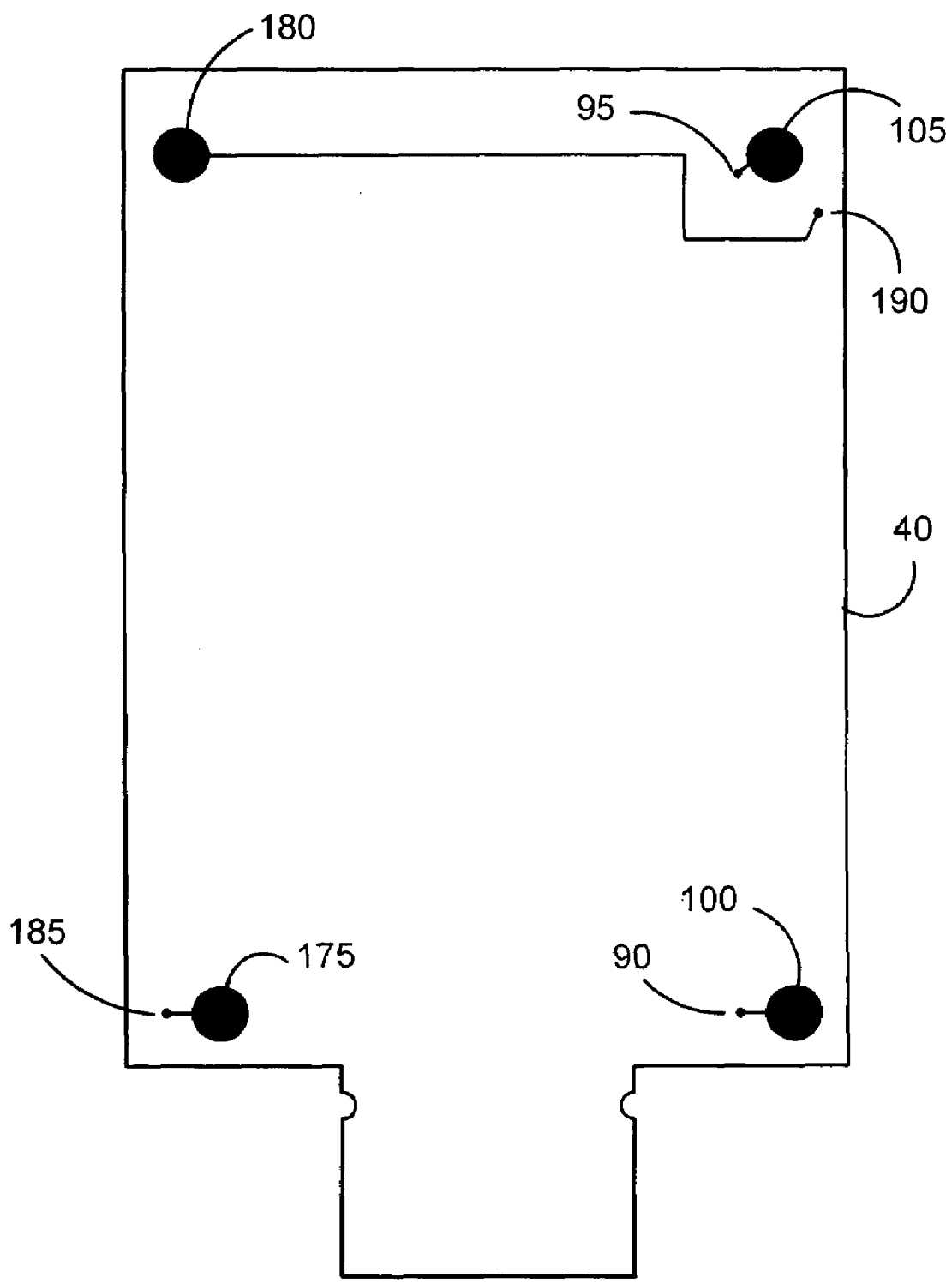
FIG. 5 is a top plan view of a secondary side layer forming a part of the PCB shown in FIG. 2.

The first security trace 135, located on the top surface of the tamper wrap 15 as illustrated in FIG. 6, is connected at a first end thereof to electrical contact 110 and at a second end thereof to electrical contact 120. Similarly, second security trace 140, located on the bottom surface of the tamper wrap 15 as illustrated in FIG. 6, is connected at a first end thereof to electrical contact 115 and at a second end thereof to electrical contact 125. Thus, when tamper wrap 15 is folded around PCB 10 as shown in FIG. 1, electrical contact 110 of tamper wrap 15 contacts electrical contact 100 of PCB secondary side layer 40, electrical contact 115 of tamper wrap 15 contacts electrical contact 105 of PCB secondary side layer 40, electrical contact 120 of tamper wrap 15 contacts electrical contact 175 of PCB secondary side layer 40, and electrical contact 125 of tamper wrap 15 contacts electrical contact 180 of PCB secondary side layer 40. Tamper wrap 15 is attached to PCB 10 and held in place by an adhesive applied to the top surface of tamper wrap 15. Preferably, the adhesive property of this adhesive is greater than the adhesive property of the adhesive used to secure the trace 135 to the tamper wrap 15, such that security trace 135 will remain attached to the PCB 10, thereby breaking and peeling away from tamper wrap 15, should it be attempted to remove the tamper wrap 15 from the PCB 10 during a tamper attempt. In addition, electrical connection between the various electrical contacts as described above is preferably ensured using a conductive bonding agent, such as, for example, silver epoxy, applied between the electrical contacts during assembly. As seen in FIG. 5, electrical contacts 175 and 180 are each connected to tamper detection circuitry provided on PCB circuitry portion 20 through vias 185 and 190, respectively. Tamper wrap 15, when folded around PCB 10 as shown in FIG. 1, covers not only the entire primary side of PCB 10 that includes PCB circuitry portion 20 (and the electronic components 22a-22c mounted thereon), but also all of the vias that are used to make electrical connections (that are outside of the area covered by serpentine traces 45, 50, 55 and 60) and electrical contacts 100, 105, 110, 115, 120, 125, 180 and 185.

Thus, as will be appreciated, the following two circuit paths exist in PCB assembly 5. The first circuit path begins with the tamper detection circuitry provided on PCB circuitry portion 20, continues through via 80, serpentine trace 45, via 65, serpentine trace 55, via 90, electrical contact 100, electrical contact 110, first security trace 135, electrical contact 175, and via 185, and ends back at the tamper detection circuitry provided on PCB circuitry portion 20. The second circuit path begins with the tamper detection circuitry provided on PCB circuitry portion 20, continues through via 85, serpentine trace 50, via 70, serpentine trace 60, via 95, electrical contact 105, electrical contact 115, second security trace 140, electrical contact 125, electrical contact 180, and via 190, and ends back at the tamper detection circuitry provided on PCB circuitry portion 20. The tamper detection circuitry, by monitoring these two circuit paths, is able to detect attempted unauthorized intrusions into PCB assembly 5 either through tamper wrap 15 or through the "security screen" provided by serpentine traces 45, 50, 55 and 60. In particular, the two circuit paths continuously conduct current, provided by the tamper detection circuitry, and the tamper detection circuitry monitors the circuit paths for broken traces or shorts created when separate traces contact one another, each of which will indicate a tamper event resulting in some action taken by the tamper detection circuitry, such as zeroing encryption keys or deleting data.

Thus, tamper wrap 15 provides a first tamper protection portion that protects the electronics and electrical nodes of PCB 10 from tampering in all areas that tamper wrap 15 covers. The serpentine traces 45, 50, 55 and 60 provided on first security trace layer 25 and second security trace layer 30 provide a second tamper protection portion in the form of a "security screen" that protects the electronics and electrical nodes of PCB 10 from tampering in the areas that they cover (and that are not covered by tamper wrap 15). As a result, PCB assembly 5 is provided with a full tamper envelope that protects all electrical nodes forming a part of PCB 10 using only a partially enveloping tamper wrap 15 (tamper wrap 15 covers the entire top and sides of PCB 10, but only a portion of the bottom of PCB 10), thereby reducing cost. In addition, the need for manual soldering and potting as in prior art methods is eliminated, thereby simplifying the overall manufacturing process.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method of manufacturing a printed circuit assembly having tamper detection circuits, said printed circuit board having a first security trace layer having first and second traces thereon, a second security trace layer, adjacent to said first security trace layer, having third and fourth traces thereon, said method comprising:

mounting circuit components to a top surface of said printed circuit board;

covering said top surface of said printed circuit board and a first portion of a bottom surface of said printed circuit board with a flexible wrap having fifth and sixth traces thereon, a second portion of said bottom surface of said printed circuit board not being covered by said flexible wrap, said first and second traces of said first security trace layer and said third and fourth traces of said second security trace layer occupying said second portion of said bottom surface of said printed circuit board;

connecting the first, third and fifth traces in series to from a first tamper detection circuit path;

connecting said second, fourth and sixth traces in series to form a second tamper detection circuit path;

wherein said flexible wrap and said first and second security trace layers provide said tamper detection circuits.

2. The method of claim 1, wherein mounting circuit components further comprises:

mounting circuit components to detect whether any one of said first, second, third, fourth, fifth and sixth traces is broken or comes into contact with another one of said first, second, third, fourth, fifth and sixth traces.

3. The method of claim 1, wherein said first, second, third and fourth traces each have a serpentine pattern.

4. The method of claim 3, wherein said first and second traces run adjacent to one another and said third and fourth traces run adjacent to one another.

5. The method of claim 4, wherein said first and second traces are offset from said third and fourth traces such that said first and second traces are aligned in gaps between said third and fourth traces.

6. The method of claim 1, wherein said printed circuit board further includes a ground plane layer adjacent to a top surface of said second security trace layer, said ground plane layer covering said first, second, third and fourth traces.

7. The method of claim 6, wherein said printed circuit board further includes a secondary side layer adjacent to a top surface of said ground plane layer, a top surface of said secondary side layer being said bottom surface of said printed circuit board.

* * * * *